United States Patent
Gino et al.

(10) Patent No.: US 11,880,721 B2
(45) Date of Patent: *Jan. 23, 2024

(54) PROCESSING A QUERY HAVING CALLS TO MULTIPLE DATA SOURCES

(71) Applicant: R Software Inc., San Francisco, CA (US)

(72) Inventors: Iddo Gino, San Francisco, CA (US); Andrey Bukati, San Francisco, CA (US); Srivatsan Srinivasan, San Francisco, CA (US)

(73) Assignee: R SOFTWARE INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,881

(22) Filed: May 25, 2022

(65) Prior Publication Data

US 2022/0291974 A1 Sep. 15, 2022

Related U.S. Application Data

(63) Continuation of application No. 16/687,721, filed on Nov. 19, 2019, now Pat. No. 11,372,693.

(Continued)

(51) Int. Cl.
*G06F 9/54* (2006.01)
*G06F 16/2458* (2019.01)
*G06F 16/2453* (2019.01)

(52) U.S. Cl.
CPC .............. *G06F 9/541* (2013.01); *G06F 9/547* (2013.01); *G06F 16/2471* (2019.01); *G06F 16/24539* (2019.01)

(58) Field of Classification Search
CPC . G06F 16/24539; G06F 16/2471; G06F 9/547
See application file for complete search history.

(56) References Cited

U.S. PATENT DOCUMENTS 8,655,867 B2 * 2/2014 Collins ............. G06F 16/24534
707/719
10,120,734 B1 11/2018 Doraiswamy et al.
(Continued)

OTHER PUBLICATIONS

EP Applicaton # 21173434.8 Office Action dated Aug. 2, 2023.

*Primary Examiner* — Dangelino N Gortayo
(74) *Attorney, Agent, or Firm* — Kligler & Associates Patent Attorneys Ltd.

(57) ABSTRACT

A method, including receiving, from a client, a unified query, and extracting, from the unified query, an endpoint query for a first data source on a first server and an endpoint query for a second data source on a second server. The extracted endpoint query for the first data source is forwarded to the first server. Upon receiving a response to the endpoint query forwarded to the first server, one or more parameters are extracted from the response. The endpoint query for the second data source is updated so as to include the extracted one or more parameters, and the updated endpoint query for the second data source is forwarded to the second server. Upon receiving, from the second server, a response to the forwarded endpoint query, a result for the received unified query is generated based on the receive responses, and the generated result is conveyed to the client.

26 Claims, 5 Drawing Sheets

Related U.S. Application Data

(60) Provisional application No. 62/769,578, filed on Nov. 20, 2018.

(56) References Cited

U.S. PATENT DOCUMENTS

| | | | |
|---|---|---|---|
| 2015/0026160 A1* | 1/2015 | Gough | G06F 16/951 |
| | | | 707/722 |
| 2016/0057107 A1 | 2/2016 | Call | |
| 2017/0103103 A1* | 4/2017 | Nixon | G06F 16/256 |
| 2017/0132277 A1* | 5/2017 | Hsiao | G06F 16/2425 |
| 2018/0359323 A1 | 12/2018 | Madden | |
| 2019/0147086 A1* | 5/2019 | Pal | G06F 16/2471 |
| | | | 707/718 |
| 2019/0163821 A1* | 5/2019 | Pal | G06F 16/27 |

* cited by examiner

PROCESSING A QUERY HAVING CALLS TO MULTIPLE DATA SOURCES

CROSS-REFERENCE TO RELATED APPLICATIONS

This application is a continuation of U.S. patent application Ser. No. 16/687,721, filed Nov. 19, 2019, which claims the benefit of U.S. Provisional Patent Application 62/769,578, filed Nov. 20, 2018, which is incorporated herein by reference.

FIELD OF THE INVENTION

The present invention relates generally to application programming interfaces (APIs), and particularly to processing a query comprising calls to multiple data sources such as APIs, API endpoints and databases.

BACKGROUND OF THE INVENTION

In computer programming, an application programming interface (API) is a set of building blocks that programmers can use to develop software applications. APIs enable two pieces of software to communicate by enabling one application to plug directly into the data and services of another application.

Types of APIs include private APIs and public APIs. A private API is an API that has its application hosted with in-house developers. Private APIs act as front end interfaces to back end data and application functions. A public API (also known as an open API) is a publicly available API that provides developers with programmatic access to a proprietary software application or web service.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including receiving, by a query processing server from a client, a unified query, extracting, from the unified query, an endpoint query for a first data source on a first server and an endpoint query for a second data source on a second server, forwarding, to the first server, the extracted endpoint query for the first data source, receiving, from the first server, a response to the forwarded endpoint query for the first data source, extracting, from the response to the endpoint query for the first data source, one or more parameters, updating, by a processor, the endpoint query for the second data source so as to include the extracted one or more parameters, forwarding, to the second server, the updated endpoint query for the second data source, receiving, from the second server, a response to the forwarded endpoint query for the second data source, generating, based on the receive responses, a result for the received unified query, and conveying the generated result to the client.

In some embodiments, each given endpoint query to a given data source on a given server includes a call to an application programming interface (API) for an application executing on the given server or a data query for data stored on the given server.

In a first embodiment, wherein the API includes a public API or a private API.

In a second embodiment, forwarding the call to a given API for an application executing on the given server includes transmitting, to an API hub in communication with the given server, a request to transmit the given call to the given server, and wherein receiving the response to the forwarded call to the given API includes receiving the response from the API hub.

In a third embodiment, the stored data can be selected from a list consisting of a database, a file and cached data. In one embodiment, a given endpoint query to a given database may be for a table in the given database, and wherein the given call includes a source and a format for the table.

In additional embodiments, the endpoint query to the second data source includes at least one of the parameters, and wherein the unified query includes the call to the second data source as a given parameter for the call to the second data source.

In further embodiments, the unified query includes at least one node and an additional parameter specifying a given node as an optional node, and the method may include detecting that there is no data for the optional node, and returning a null value for the optional node.

In one embodiment, the result includes one or more nodes, wherein the unified query includes an alias for a given node, and the method may include updating the node in the response with the alias.

In another embodiment, the response from the forwarded call to the first data source includes data having a first format, wherein extracting at least one or more of the parameters includes converting the data to a second format, and wherein the updated call to the second data source includes the converted data.

In supplemental embodiments, the unified query includes a first unified query, and the method includes storing the result to a cache, receiving a second unified query identical to the first unified query, and responding to the second unified query with the cached result.

In some embodiments, the unified query includes a conditional value.

In additional embodiments, the results from the unified calls include multiple data elements, and wherein the unified query specifies one or more of data elements for exclusion, and the method may include removing the specified one or more data elements from the result.

In further embodiments, the method may include storing, to a memory, a set of query identifies and a set of corresponding stored unified queries wherein receiving the unified query includes receiving an identifier, and identifying, in the memory, a given query identifier matching the received identifier, wherein the received unified query includes the stored unified query corresponding to the identified query identifier.

There is also provided, in accordance with an embodiment of the present invention, a query processing server including a memory, and at least one processor configured to receive, from a client, a unified query, to extract, from the unified query, an endpoint query for a first data source on a first server and an endpoint query for a second data source on a second server, to forward, to the first server, the extracted endpoint query for the first data source, to receive, from the first server, a response to the forwarded endpoint query for the first data source, to extract, from the response to the endpoint query for the first data source, one or more parameters, to update the endpoint query for the second data source so as to include the extracted one or more parameters, to forward, to the second server, the updated endpoint query for the second data source, to receive, from the second server, a response to the forwarded endpoint query for the second data source, to generate, based on the receive responses, a result for the received unified query, and to convey the generated result to the client.

There is further provided, in accordance with an embodiment of the present invention, a computer software product for ranking a set of application programming interfaces (APIs) for a plurality of software applications executing on respective servers, the product including a non-transitory computer-readable medium, in which program instructions are stored, which instructions, when read by a computer, cause the computer to receive, from a client, a unified query, to extract, from the unified query, an endpoint query for a first data source on a first server and an endpoint query for a second data source on a second server, to forward, to the first server, the extracted endpoint query for the first data source, to receive, from the first server, a response to the forwarded endpoint query for the first data source, to extract, from the response to the endpoint query for the first data source, one or more parameters, to update the endpoint query for the second data source so as to include the extracted one or more parameters, to forward, to the second server, the updated query for the second data source, to receive, from the second server, a response to the forwarded endpoint query for the second data source, to generate, based on the receive responses, a result for the received unified query, and to convey the generated result to the client.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Traditionally, developers write multiple queries in different languages to access and combine information from different sources such as databases and web services. This can become more complex when combining information returned from internal and/or public application programming interface (API) calls, since each API call has its own format.

Embodiments of the present invention provide methods and systems for receiving and processing a unified query that comprises a sequence of endpoint queries, wherein a result of one of the endpoint queries can be used as an input parameter to another endpoint queries in the sequence. As described hereinbelow, upon a query processing server receiving a unified query from a client, an endpoint query for a first data source on a first server and an endpoint query for a second data source on a second server are extracted from the unified query.

In one embodiment, a given endpoint query for a given data source may comprise a call to an API for an application executing on a given server. In some embodiments, the API may comprise a public API or a private API. In this embodiment, the given data source comprises the API.

In another embodiment, a given endpoint query for a given data source may comprise a data query for data stored on a given server. Examples of data stored on a given server that can be queried using embodiments of the present invention include, but are not limited to, databases, files (e.g., .CSV files), and data stored in the given server's memory or cache. In this embodiment, the given data source comprises the data stored on the given server.

The extracted endpoint query for the first data source is forwarded to the first server, and upon receiving, from the first server, a response to the forwarded endpoint query for the first data source is received, and one or more parameters are extracted from the response to the endpoint query for the first data source. The endpoint query for the second data source is updated so as to include the extracted one or more parameters, and the updated endpoint query for the second data source is forwarded to the second server. Upon receiving, from the second server, a response to the forwarded endpoint query for the second data source, a result for the received endpoint query is generated based on the receive responses, and the generated result is conveyed to the client.

As described hereinbelow, examples of data sources include, but are not limited to, APIs, API endpoints or database tables. In embodiments described herein API endpoints comprise specific digital destination locations to which requests for information (i.e., an API call) are sent.

Systems implementing embodiments of the present invention enable a developer to code and submit a unified query that accesses multiple data sources including databases and APIs, and to join data sources in a single unified query to combine or enrich data. Additionally, as described hereinbelow, API calls can be nested so that a result of a first API call embedded in a second API call can be used as an input parameter to the second API call.

System Description

Figure 1:
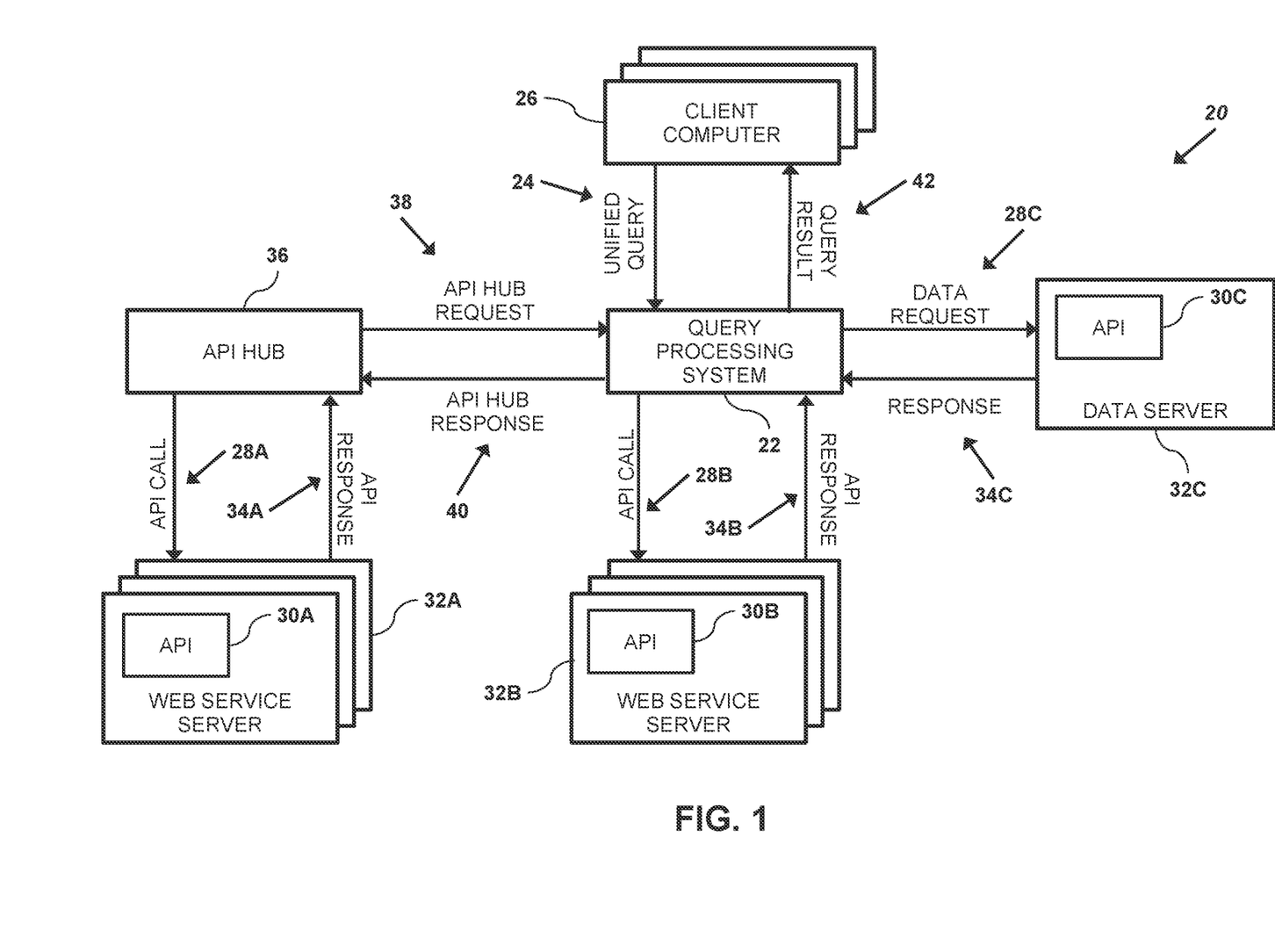
FIG. 1 is a block diagram that schematically shows a computing facility comprising a query processing system, an application programming interface (API) hub and multiple servers having respective APIs, in accordance with an embodiment of the present invention.

FIG. 1 is a block diagram that schematically shows a computing facility 20 comprising a query processing system 22 (also referred to herein as a query processing server) that receives and processes unified queries 24 received from one or more client computers 26, in accordance with an embodiment of the present invention. As described hereinbelow, query processing system 22 parses the received unified query so as to extract endpoint queries 28 to data sources 30 hosted by respective servers 32. Servers 32 are configured to process the received endpoint queries, to generate respective responses 34, and to transmit the generated responses to query processing system 22.

In FIG. 1, endpoint queries 28 and responses 34 are differentiated by appending a letter to the identifying numeral, so that the data requests comprise API calls 28A and 28B, and data request 28C, and the responses comprise API responses 34A and 34B, and response 34C. In embodiments described herein, endpoint queries 28 may also be referred to as API calls 28A-B and data requests 28C.

In a first embodiment, query processing system 22 can transmit a given endpoint query 28 directly to a given server 32. Upon processing the given endpoint query, the given server can transmit an API response 34 to query processing system 22.

In a second embodiment, query processing system 22 can transmit, to an API hub 36, an API hub request 38 comprising a given API call 28. Upon receiving API hub request 38, API hub 36 identifies the given API call in the API hub request, and transmits the given API call to a given server 32. Upon processing the given API call, the given server can transmit an API response 34 to API hub 36, and upon receiving the API response, the API hub can convey, to query processing system 22 the received API response in an API hub response 40.

In FIG. 1, servers 32 and their respective data sources 30 are differentiated by appending a letter to the identifying numeral, so that the data sources comprise APIs 30A-30C, and the servers comprise servers 32A-32C. In embodiments described herein, the APIs hosted by servers 32A and 32B are for web services (e.g., sending an SMS or sending an email), and the API hosted by server 32C is for a database management system (DBMS) such as MySQL (www.mysql.com).

In embodiments of the present invention, each unified query 24 may comprise multiple endpoint queries 28 to one or more servers 32. Upon receiving a given unified query 24 from a given client computer 26, parsing the received query, transmitting one or more API hub requests 38 and/or endpoint queries 28 (i.e., from the parsed query), and receiving responses 34 to endpoint queries 28 and responses 40 to hub requests 38, query processing system 22 can generate a query result 42 based on responses 34 and 40, and convey the query response to the given client computer.

Figure 2:
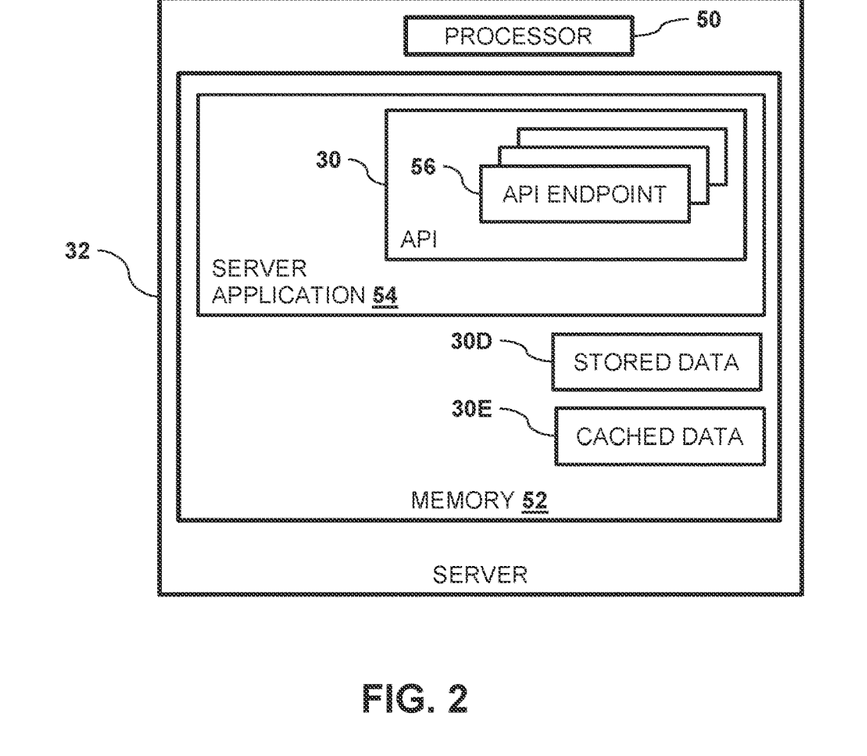
FIG. 2 is a block diagram showing a configuration of a given server, in accordance with an embodiment of the present invention.

FIG. 2 is a block diagram showing a configuration of a given server 32, in accordance with an embodiment of the present invention. Each server 32 may comprise a server processor 50 that executes, from a server memory 52, a server application 54 comprising a respective API 30 that hosts a respective set of API endpoints 56. Each given API call 28 to a given API endpoint 56 in a given application 54 typically comprises a request to retrieve information from or to store data to the given server application. In operation, upon one of the endpoints in a given server application 54 receiving a given API call 28 from a computer (i.e., a given client computer 26 or API hub 36), and in response to processing the received API call, the given server application can convey a given API response 34 back to the computer.

As described supra, the APIs hosted by servers 32A and 32B are for web services, and the API hosted by server 32C is for a DBMS. Therefore, applications 54A and 54B provide services such as sending an SMS, providing information about the current weather or sending an email, and application 54C comprises a DBMS application such as MySQL.

In some embodiments, memory 52 may comprise additional data sources comprising stored data 30D and cached data 30E. Examples of stored data 57 include, but are not limited to, databases and files (e.g., .CSV files). In embodiments described herein sources 30 may also be referred to as APIs 30A-C, stored data 30D and cached data 30E.

As described supra, server 32 comprises a data server. In some embodiments, the server application executing on server 32 comprises a database server such as MySQL. In these embodiments, stored data may comprise a database having one or more tables, and data request 28C may comprise a database query (e.g., to retrieve fields from a given table).

Figure 3:
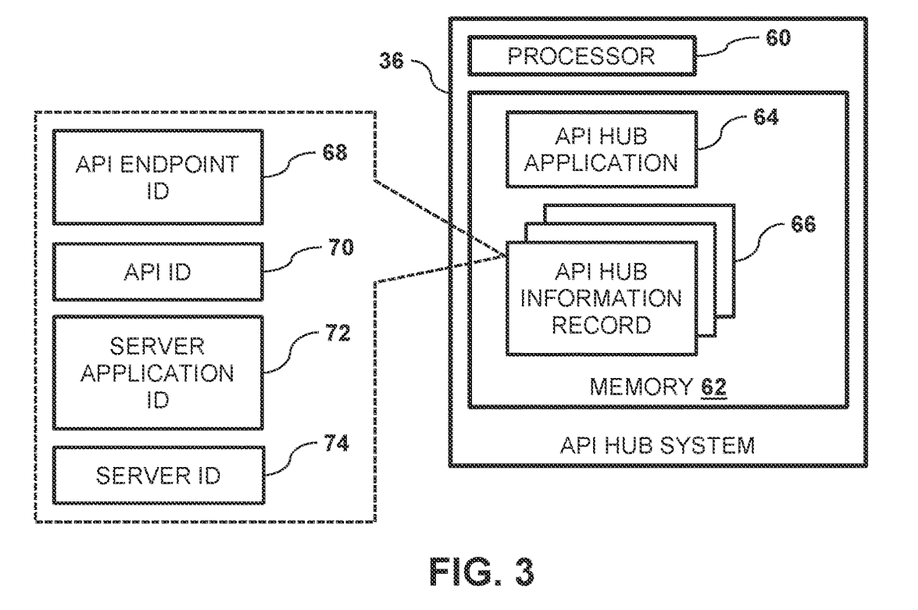
FIG. 3 is a block diagram showing a configuration of the API hub, in accordance with an embodiment of the present invention.

FIG. 3 is a block diagram showing a configuration of API hub 36, in accordance with an embodiment of the present invention. API hub system 36 may comprise a hub processor 60 and a system memory 62 that stores an API hub application 64 and a set of API hub information records 66. In embodiments of the present invention, a given API hub request 38 may comprise a request for a given API call 28.

In some embodiments, upon receiving the given API call request, API hub application 64 conveys the given API call to the API of a given server application 54 executing on a given server 32.

Each API hub information record 66 may comprise an API endpoint identifier (ID) 68 that references a given API endpoint 56, and API ID 70 that references a given API 30 that comprises the given API endpoint, a server application ID 72 that references a given server application 54 that hosts the given API and a server id 74 that executed the given server application.

In some embodiments, upon API hub application 64 receiving, from query processing system 22, a given API hub request 38, the API hub application can perform the following steps to process the received API hub request:

Generate, from the received request, a given API call 28 to a given API endpoint 56.

Identify a given API hub information record 66 whose respective API endpoint ID 68 corresponds to the identified API endpoint.

Identify a given server application 54 and a given server corresponding to the server application ID 72 and server ID 74 in the identified API hub information record.

Convey the generated API call to the given API endpoint hosted by the identified server application executing on the identified server.

Receive a given API response 34 from the identified server.

Forward the received API response to query processing system 22.

Figure 4:
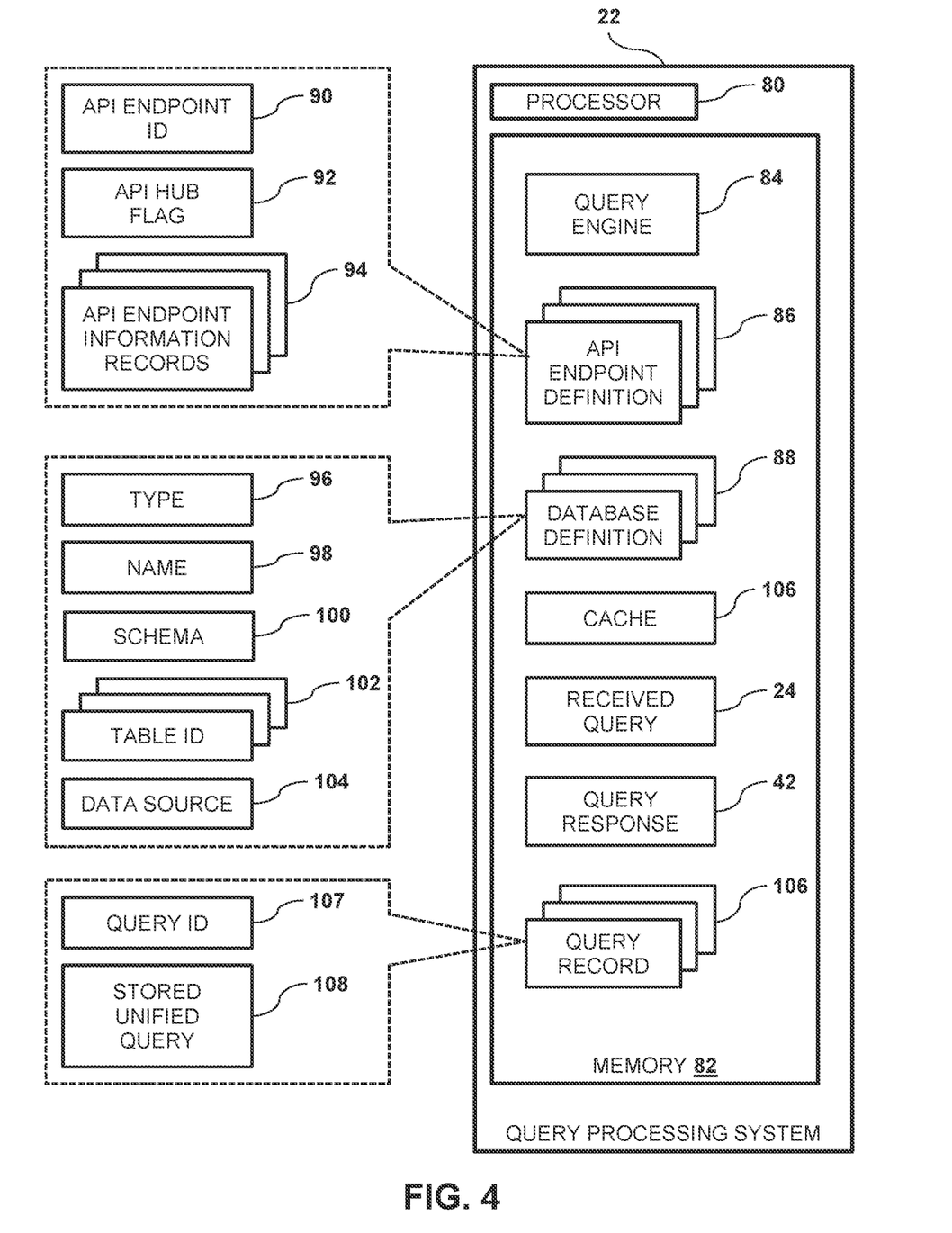
FIG. 4 is a block diagram showing a configuration of the query processing system, in accordance with an embodiment of the present invention.

FIG. 4 is a block diagram showing a configuration of query processing system 22, in accordance with an embodiment of the present invention. Query processing system may comprise a query processor 80 that executes, from a query memory 82, a query engine 84 (also referred to herein simply as engine 84). In the configuration shown in FIG. 4, query processing system 22 also stores, in memory 82, API endpoint definitions 86 and database definitions 88.

Each given API endpoint definition 86 may comprise information such as:

An API endpoint ID 90 that references a given API endpoint 56.

An API hub flag 92 that indicates whether or not the given API endpoint can be accessed via API hub 36. If the API hub flag is "true", then query processing system 22 can either (a) transmit a given API call 28 directly to the server hosting the given API endpoint, or (b) transmit a given API hub request 38 comprising the given API call.

One or more API endpoint information records 94. Each given API endpoint information record 94 comprises, for the given API endpoint, information such as a base Uniform Resource Locator (URL), a path, and all input information such as headers, a path/query/form, and body parameters.

Each database definition 88 may comprise information such as a database type 96 (e.g., MySQL, Postgres and Redis), a database name 98, a database schema 100, one or more table IDs 102 and a data source 104. Data source 104 can reference one or more files in memory 52 where a given database (i.e., indicated by name 98) is stored.

In some embodiments data source 104 may include additional information such as a specification for querying the database and a format for the data. Using these embodiments can enable query engine 84 to query a database stored in different types of files, such as a comma-separated values (CSV) file.

In some embodiments, memory 82 may comprise a cache 106. Cache 106 can be used to cache recent query responses 42, as described hereinbelow.

In embodiments described hereinbelow, query engine 84 is configured to receive unified query 24 from a given client computer 26, and to process the received query so as to generate query result 42. In some embodiments, memory 82 can be configured to store unified query 24 and query result 42.

In an additional embodiment, memory 82 may also store query records 106. Each query record 106 comprises a query ID 107 and a corresponding stored unified query 108. In this embodiment, upon receiving a given unified query that comprises a given query ID 107, processor 80 can locate a given query record 106 with the given query ID, and execute the corresponding stored query 108 using embodiments described herein.

Processors 50, 60 and 80 comprise general-purpose central processing units (CPU) or special-purpose embedded processors, which are programmed in software or firmware to carry out the functions described herein. This software may be downloaded to query processing system 22, servers 32 and API hub system in electronic form, over a network, for example. Additionally or alternatively, the software may be stored on tangible, non-transitory computer-readable media, such as optical, magnetic, or electronic memory media. Further additionally or alternatively, at least some of the functions of processors 50, 60 and 80 may be carried out by hard-wired or programmable digital logic circuits.

Examples of memories 52, 62 and 82 include dynamic random-access memories and non-volatile random-access memories. Additionally or alternatively, the memories may comprise non-volatile storage devices such as hard disk drives and solid-state disk drives.

In some embodiments, the functionality of some or all of query processing system 22, client computers 26, servers 32 and API hub system 36 may be deployed in a data cloud and/or as virtual machines in one or more computing facilities such as computing facility 20. In one embodiment, the respective functionalities of query processing system 22 and API hub system 36 may be distributed over multiple physical and/or virtual computers. In another embodiment, the respective functionalities of query processing system 22 and API hub system 36 may be implemented on a single virtual machine or a single physical computer. In other words, API hub application 64 and query engine 84 may execute on a single virtual machine or a single physical computer.

Query Processing

Figure 5:
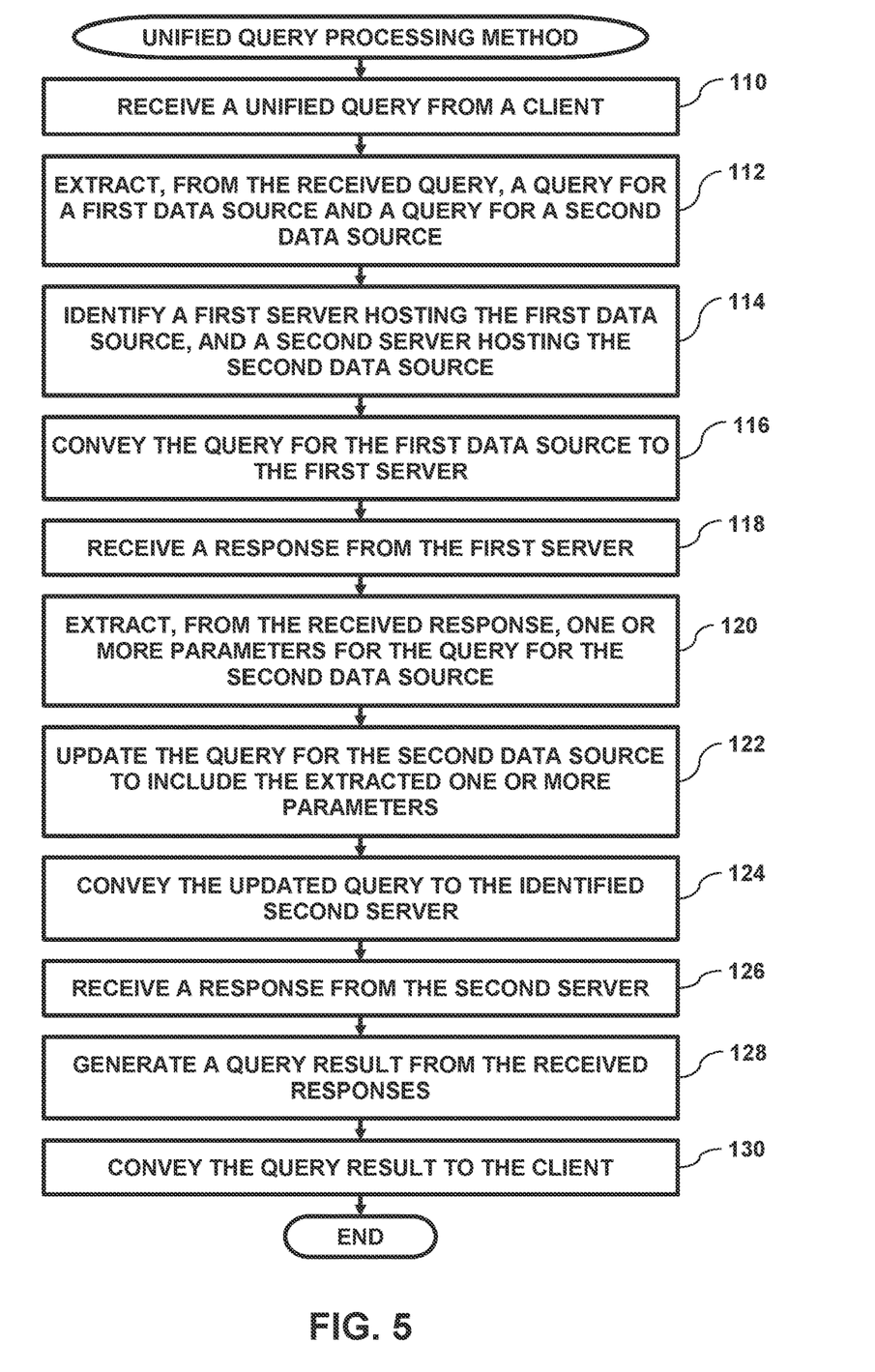
FIG. 5 is a flow diagram that schematically illustrates a method of processing a unified query comprising multiple endpoint queries, in accordance with an embodiment of the present invention.

FIG. 5 is a flow diagram that schematically illustrates a method of processing a given unified query 24 that engine 84 analyzes so as to generate multiple endpoint queries 28, in accordance with an embodiment of the present invention. In some embodiments API hub application 64 may comprise the RapidAPI™ platform produced by R Software Inc. (San Francisco, California, U.S.A.), and query engine 84 may comprise a RapidQL™ server application (also produced by R Software, Inc.).

As described hereinbelow, query engine 84 can parse and translate a composite unified (query e.g., a RapidQL™ query) by splitting and translating the composite query specified in a uniform language into an individual endpoint queries 28 to data sources such as API endpoints 56 or database tables. Query engine 84 can extract operations from the unified query to determine the checks, typecasting, and transformations (e.g., filter, limit, sort) in order to perform on the results of each individual query and accurately sequences the individual queries with transformed results of earlier queries used as parameters for following queries where required. Based on the language specification, results can be obtained from any and/or all stages of pre and/or post-transformed results of any of the individual queries. In some embodiments, results can be cached to enhance performance of any future queries.

In one embodiment, RapidQL™ can use the following formats for calling a given API endpoint 56 in a given API 30:

Calls to public APIs hosted by API hub system 36. These calls can have the structure HubName.API.endpoint, where HubName is a text string that identifies API hub system 36 or API hub application 54. For example, if API hub application 54 comprises the RapidAPI™ platform, the calls can have the structure RapidAPI.API.endpoint.

Calls to public APIs not hosted by the RapidAPI™ platform. These calls have the structure Http.<operation>(url:'EndpointURL', parameters), where operation is get/post/patch/delete. In some embodiments APIs housed by API hub system 36 can also be called (i.e., in query 24) using this format.

Calls to database servers. These calls have the structure DBType.DBName.Table.Operation, where DBType is a database type (e.g., MySQL), DBname is a database name, Table is a given table name, and Operation is a given database operation (e.g., find( )).

The steps in FIG. 5 describe query engine 84 receiving and processing the following first example of a given RapidQL™ query 24 that retrieves all the users from a MySQL database, and then submits their respective mail addresses to an email validation API called "Mailbox Layer" (mailboxlayer.com) that returns a score for email address validation. In this example (also referred to herein as Query1), both of the APIs are accessed via the RapidAPI™ platform:

```
{
  MySQL.Demo.users.find({
    username,
    email,
    profile_image,
```

```
            Http.post(url:
    'https://Mailboxlayervolodimir.kudriachenkoV1.p.rapidapi.com/c
    heckEmail',
            params: {
                email: 'email',
                apiKey: '*****************'
            }
        ) {
    score
        }
    }
}
```

This example comprises a first data request 28C (i.e., a database query) to database server 32C, and a second API call 28A to a given API 30A hosted by API hub 36 (i.e., the RapidAPI™ platform). Other examples of queries 24 are described hereinbelow.

In a first receive step 110, engine 84 receives the unified query from a given client computer 26, and stores the received unified query to memory 82. In a first extraction step 112, the query engine extracts a first endpoint query 28 to a first data source 30, and a second endpoint query 28 to a second data source 30. In this example:

The first extracted endpoint query comprises an API call MySQL.Demo.users.find( ), where DBType="MySQL", DBName="Demo", Table="Users", and Operation="find( )".

The second extracted endpoint query comprises an API call checkEmail.

In an identification step 114, query engine 84 analyzes API endpoint definitions 86 and database definitions 88 to identify a first server 32 hosting the first data source (i.e., API call), and a second server 32 hosting the second data source (i.e., API call). In this example, the first server comprises server 32C, and the second server comprises a given server 32A whose respective API 30A can be accessed via API hub 36.

In a first convey step 116, query engine 84 conveys the first endpoint query to the first server. In this example, query engine 84 conveys the first API call to server 32C.

In a second receive step 118, query engine 84 receives a given API response 34C from the first server, and in a second extraction step 120, the query engine extracts, from the received API response, one or more parameters for the second endpoint query. In this example, the API response includes username, email and profile_image, and query engine 84 extracts email as a parameter for the second API call.

In an update step 122, query engine 84 updates the second endpoint query with the extracted one or more parameters. In this example, query engine 84 updates the second API call with the email addresses in the data retrieved by the first API call.

In a second convey step 124, query engine 84 conveys the updated second endpoint query to the second server. In this example, query engine 84 embeds the updated second API call in a given API hub request 38, to API hub 36, and the API hub processes the given API hub request by forwarding the updated second API call to a given server 32A using embodiments described hereinabove.

In a third receive step 126, query engine 84 receives a response from the second server. In this example, API hub 36 receives, from the given server 32A, a given API response 34A comprising respective email validation scores for the email addresses, forwards the received response to query engine 84, and the query engine receives the forwarded response.

In a generation step 128, query engine 84 uses the results of the first and the second API calls to generate a given unified query response 42, which the query engine stores to memory 82. In this example, the query response comprises a list of records, each of the records comprising username, email and profile_image data from the first API call, and score data from the second API call.

Finally, in a third convey step 130, query engine 84 conveys the generated query response to the given client computer, and the method ends.

In some embodiments, a first given API call 28 can be "nested" as a parameter for a second given API call 28. For example, if a first API call Call-1 (X) returns a date, and a second API call Call-2 (P1, P2) requires a date for parameter P2, RapidQL™ can process the query Call-2(P1, Call-1(X)), where the result of Call-1( ) is used for P2.

In additional embodiments, a given query 24 can use a context object as a second argument. This context object allows one to define commonly used variables as constants. Using a context object as a second arguments is shown in the following second example of a given RapidQL™ query 24 that uses the Yelp™ API (produced by Yelp, Inc., San Francisco, California, U.S.A.) for the first API and the Uber™ API (produced by Uber Technologies, Inc., San Francisco, Calif., U.S.A.). This RapidQL™ query retrieves restaurant names from the Yelp™ API and couples them with respective Uber™ ride estimates. In this example as well, both of the APIs are accessed via the RapidAPI™ platform:

```
rql.query(
'{
    RapidAPI.YelpAPI.getAccessToken(appId:    appId,
appSecret: appSecret) {
RapidAPI.YelpAPI.getBusinesses(accessToken:access_token,locati
on: "san francisco") {
            businesses {
            name,
            display_phone,
            coordinates {
RapidAPI.UberRide.getProductsPrices(accessToken: accessToken,
startLatitude:        currentLatitude,      startLongitude:
currentLongitude, endLatitude:    latitude,      endLongitude:
longitude) {
                prices {
                    display_name,
                    estimate,
                    duration
                }
            }
        }
    }
}
}',
{
    "currentLatitude": "37.792955",
    "currentLongitude": "-122.404794",
        "appId":
        "appSecret": "****",
        "accessToken": "****"
})
```

In this second example, rql.query( ) has been passed two different arguments: a query and a context. The context object has defined latitude, longitude, and any authentication credentials as constants. Upon defining these constants, query engine 84 can use those constants as variables throughout the query. Therefore, to alter the parameters of the query in any way, only the context object itself needs to be changed.

In some embodiments, query engine 84 can access public APIs that are not hosted on the API platform. For example, the RapidQL™ server application can enable a given query 24 to connect to any HyperText Transfer Protocol (HTTP) Uniform Resource Locator (URL) using get, patch, post, and put requests. An HTTP request in a RapidQL™ query can take many parameters beyond the URL. These parameters include:

url: a fully qualified URL.
body: an entity body for PATCH, POST and PUT requests (not usable on GET requests).
form: data to pass for a multipart/form-data request (not usable on GET requests).
json: a boolean that when true, sets body to JSON representation of value and adds the Content-type: application/json header (not usable on GET requests).
headers: HTTP headers (default: { }).
bearer: an Auth bearer token.
basic: credentials for basic authorization.

Connecting to a public API via HTTP is shown in the following third example:

```
const RapidQL = require('RapidQL');
const rql = new RapidQL({ });
rql.log('{
  Http.get(
    url:"http://httpbin.org/ip",
    basic: {
      username:"johnSmith",
      password:"abcd123"
    }
  ){
    origin
  }
}');
```

In some embodiments, a given query 24 may comprise additional query parameters that can query engine 84 can use to sharpen the results for the given query. The following embodiments describe some of the query parameters are implemented in RapidQL™.

In a first query parameter embodiment, a given query 24 may comprise optional parameters. For example, RapidQL™ typically requires every defined node to be included in the context or resulting query. If the node is not found in the results or context, an error will be generated. To bypass (i.e., ignore) this error, a node can be defined as an optional node using a "?". For example, consider the following first query:

```
rql.query('
{
  a
}
', {
  a: 1,
  b: 2
})
```

The result of the following query will be {a: 1}. Now consider the following second query:

```
rql.query('
{
  a,
  ?c
}
', {
  a: 1,
  b: 2
})
```

The second query includes another node "c". If this query is executed, query engine 84 generates the following an error: Name c does not exist in context: {a: 1, b: 2}.

The following third query includes a "?" parameter that instructs query engine 84 to bypass the error:

```
rql.query('
{
  a,
  ?c
}
', {
  a: 1,
  b: 2
})
```

Inserting the "?" parameter "?" right before the node in question instructs query engine 84 to return the node with a null value if the node is not found in the query result(s) or the context. Therefore, the result of the third query will be: {a: 1, c: null}.

In a second query parameter embodiment, a given query 24 may comprise an alias. Sometimes, database and RapidAPI™ query names can get long. RapidQL™ queries can use the formula aliasName:node enables aliasing each node as a different name to streamline query results.

For example, the query

```
rql.query('
{
  a,
  ?c
}
', {
  a: 1,
  b: 2
})
``` generates the following response:

```
{
  "MySQL.Demo.users.find": [{
    "email": "johnsmith@gmail.com",
    "RapidAPI.Mailboxlayer.checkEmail": {
      "score": 0.96
    }
  }]
}
```

The keys in this resulting object are long, and therefore can be frustrating to access. RapidQL™ enables aliasing the MySQL and RapidAPI™ nodes using the following syntax:

```
{
    database:MySQL.Demo.users.find( ) {
        username,
        email,
        profile_image
        valid:RapidAPI.Mailboxlayer.checkEmail(email:
email, apiKey: "****") {
            score
        }
    }
}
``` which generates the more readable response:

```
{
    "database": [{
        "email": "johnsmith@gmail.com",
        "valid": {
            "score": 0.96
        }
    }]
}
```

In a third query parameter embodiment, a given query 24 may use type casting to ensure that the format of a result of the first query matches the required format for a parameter of the second query. For example, in the following query, age can be an integer or a string number, and birthDate can be a Date object, or a string in any date format:

```
{
    user:RapidAPI.FacebookGraphAPI.getUser(userid:    id,
accessToken: token) {
        name,
        age,
        birthDate,
        profilePicture {
            full_url,
            thumbnail_url
        }
    }
}
```

By typecasting the results (i.e., by reformatting/converting the results using casts for int, float and date), query engine 84 can ensure that age is an int and birthDate is a Date object, as shown in the following query:

```
{
    user:RapidAPI.FacebookGraphAPI.getUser(userid:    id,
accessToken: token) {
        name,
        int(age),
        date(birthDate),
        profilePicture {
            full_url,
            thumbnail_url
        }
    }
}
```

In this example, query engine 84 can attempt to convert the data to the right type. For example, if age is a float, query engine 84 can cast it to an int, if age is a character string, the query engine can determine if it could be parsed as an int (e.g., "12" would become 12).

In some embodiments, query engine 84 can use information stored in API endpoint information records 94 to determine the required typecasting.

In a fourth query parameter embodiment, a given query 24 may comprise a "*" parameter that instructs query engine 84 to cache results of certain parts of the given query in order to speed up execution of the query by removing redundant requests to databases and/or public APIs. For example, consider the following two queries:

(1)
```
{
    *Http.get(url:"http://httpbin.org/ip") {
        origin
    }
}
```

(2)
```
{
    *Http.get(url:"http://api111.com/") {
        data
    },
        *Http.get(url:"http://api111.com/") {
        data
    },
        *Http.get(url:"http://api222.com/") {
        data
    }
}
```

After executing the first query, the cache will trigger if the same function is called again with the same arguments exactly. Therefore, in the second query, query processing system 84 can store the first request to api111 to cache 106 in memory 82, and the cached request can be used by the second call. However, the third call to api222 will not use the cache as it has different arguments. Using the cache is recommended when traversing large arrays of data to append information, where the data can be repetitive and does not change.

In a fifth query parameter embodiment, a given query 24 may comprise a parameter that specifies a conditional value. For example, {% if arrived==true %}"hello"{% else %}"bye"{% endif %} checks whether a parameter arrived is returned as true or false, and specifies a downstream parameter based on its value.

Sometimes, APIs return, nested in multiple object layers, data that may be needed, like in the following example:

```
{
    user: {
        id: 12345678,
        details: {
            name: "John Smith",
            age: 21
        }
    }
}
```

In a sixth query parameter embodiment, a given query 24 may comprise a parameter "−" to remove non-desired information from the query result. For example, the result of query

```
{
    -user {
        -details {
            name,
            age
        }
    }
}
``` will be:

```
{
    name: "John Smith",
    age: 21
}
```

Appendix 1—RAPIDQL Query Processing

RapidQL™ is essentially structured like a tree. Every query is made up of function nodes or leaf nodes. Function nodes are what query APIs 30 or databases and every RapidQL™ query begins with a root function node.

Figure 6:
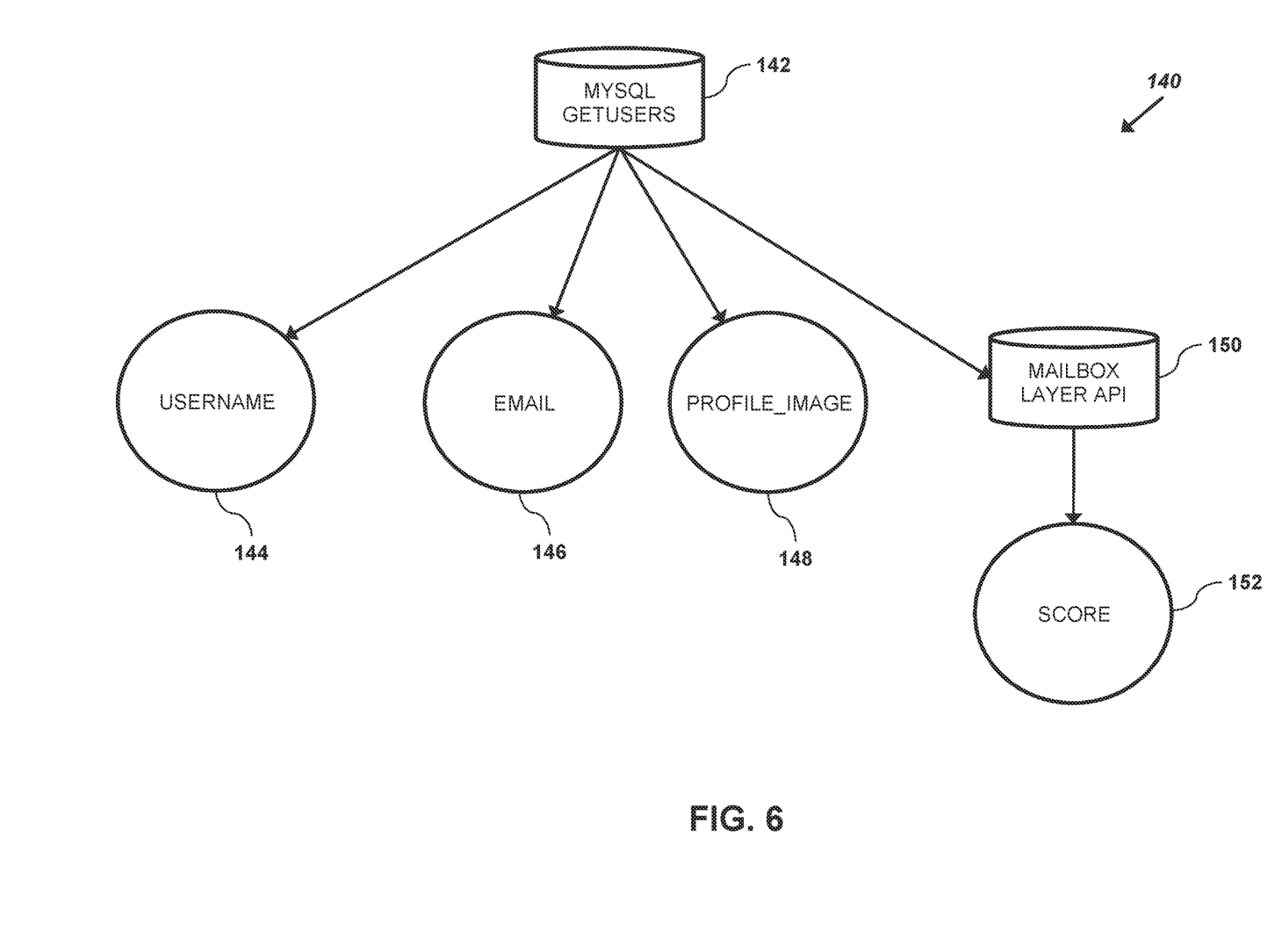
FIG. 6 is a data graph comprising a visual representation of given query, in accordance with an embodiment of the present invention.

FIG. 6 is a data graph 140 comprising a visual representation of Query1 (presented in the description referencing FIG. 5 hereinabove), in accordance with an embodiment of the present invention.

When this query is parsed and run, the RapidQL engine assesses this query in a breadth-first manor starting at root function 142 (i.e., the MySQL query in Query1 that retrieves user names, email addresses and profile images). Once root function 142 returns child function nodes username 144, email 146, and profile_image 148 (i.e., all the requested data) the child function nodes are then assessed by passing the user's email (i.e., from node 146) to the Mailbox Layer API in node 150, which returns a validation confidence score in node 152.

In the following RapidQL™ query example (in this case, a node.js example), a news API is called to search for news articles since 2019-09-20 about the "economy". For this example, we are limiting it to the first 5 results from the API:

```
const RapidQL = require('RapidQL');
let rql = new RapidQL({
});
rql.query('{
    - CTWsearch : Http.get(
        url:"https://contextualwebsearch-websearch-
v1.p.rapidapi.com/api/Search/NewsSearchAPI?fromPublishedDate=2
019-09-
20&autoCorrect=false&pageNumber=1&pageSize=5&q=economy&safeSea
rch=true",
        headers : {
            "X-RapidAPI-Host": "contextualwebsearch-websearch-
v1.p.rapidapi.com",
            "X-RapidAPI-Key": "RAPIDAPI-KEY"
        }
    ){
        - value {
            body,
            - aylien : Http.get(
                url:"https://aylien-
text.p.rapidapi.com/sentiment?text={{body}}",
                headers : {
                    "x-rapidapi-host":          "aylien-
text.p.rapidapi.com",
                    "x-rapidapi-key": "RAPIDAPI-KEY"
                }
            ) {
                res : polarity
            }
        }
    }
}')
.then((res) => console.log(res))
.catch((err) => console.log(err));
```

After being parsed by query engine 84, this query essentially becomes a forest of nodes (forest=graph structure with multiple trees). In this example, the query's root node creates the following child nodes:

+ a Flatten Node: created by "–" to flatten the value obtained from the evaluation of CTWsearch node.
+ a Rename Node: created by ":" renaming the Http.get( . . . ) call to CTWsearch.
+ a Function Node: created by indicated by "Http.get( . . . )" call which spawns a Composition Node that will need to create an Array Node or an Object Node based on what the evaluation of the Function Node results in.
++ a Child Node: value under parent Http.get call.
+++ a Child Node: body under parent value.
+++ a Child Node: Http.get under parent value (also note the Flatten and Rename nodes with – and : for this call to the Aylien API (produced by Aylien, Dublin 2, Ireland).
+++ a Function Node: created by Http.get (for the Aylien API call).
++++ a Rename Node: created by ":" for renaming the polarity field to res.

During the Execution:

Query engine 84 will call the eval( ) function of the topmost node in each tree.

The node will evaluate.

If it has children nodes, it will call their eval( ) function as well.

When done, it will return the data to be added to the result. The interpreter will append that data to the result, under the key returned by the node's getName( ) function.

In this Node.Js Example:

The flatten node and rename node wait for the function node to evaluate.

The function node (API call to Contextual Search News API) is executed and the JSON response returned (pasted below) includes an array "Value" with 5 elements (since the API is called with a parameter size=5) each of which is an object that has a property called "body".

The function node spawns five copies of its child nodes to evaluate with each of the objects in the array.

The value node is flattened to make "body" directly reference able in its child nodes.

Each of the five copies of the function nodes (from executes with the "body" object passed to it resulting in an API call to the Aylien API (i.e., the http.get node).

The function node evaluation for each child node returns an object that has a property called "polarity".

This rename node for res evaluates, passing the value of the property polarity to res.

The data returned from execution of the nodes are added to the result (in this case body and res).

The following is an example of a raw code snippet for the call to Contextual News Search API:

```
curl --request GET \
--url 'https://contextualwebsearch-websearch-
v1.p.rapidapi.com/api/Search/NewsSearchAPI?fromPublishedDate=
2019-08-20&autoCorrect=
false&pageNumber=1&pageSize=5&q=economy&safeSearch=true' \
--header 'x-rapidapi-host: contextualwebsearch-websearch-
v1.p.rapidapi.com' \
--header 'x-rapidapi-key: <APIKEY>
```

This RapidQL™ query only returns the exact information that was requested—i.e., the body of each news article and the polarity field of the sentiment analysis of that body, with polarity remapped to a parameter called res. With this RapidQL™ query saved and run from the cloud (e.g., using the RapidAPI™ platform), only the results of the query are sent back to the client making it highly efficient in terms of bandwidth as well as development time and code needed on the client.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
receiving, by a query processing server from a client, a unified query;
extracting, from the unified query, a call to an application programming interface (API) for an application executing on a first server and a data query for a data source on a second server;
forwarding, to the first server, the call to the API;
receiving from the application executing on the first server a first response to the call;
extracting from the first response one or more parameters;
updating, by a processor, the data query for the data source to include the extracted one or more parameters;
forwarding, to the second server, the updated data query for the data source;
receiving, from the second server, a second response to the updated data query;
generating, based on the first and second responses, a result for the received unified query; and
conveying the generated result to the client.

2. The method according to claim 1, wherein the API comprises a public API or a private API.

3. The method according to claim 1, wherein forwarding the call comprises transmitting, to an API hub in communication with the first server, a request to transmit the call to the first server, and wherein receiving the first response comprises receiving the first response from the API hub.

4. The method according to claim 1, wherein the data source on the second server is selected from a list of data sources consisting of a database, a file and cached data.

5. The method according to claim 4, wherein the data query is for a table in the database, and wherein receiving the second response comprises receiving a source and a format for the table.

6. The method according to claim 1, wherein the unified query comprises at least one node and an additional parameter specifying a given node as an optional node, and comprising detecting that there is no data for the optional node, and returning a null value for the optional node.

7. The method according to claim 1, wherein the result comprises one or more nodes, wherein the unified query comprises an alias for a given node, and comprising updating the node in the response with the alias.

8. The method according to claim 1, wherein the first response comprises data having a first format, wherein extracting the one or more parameters comprises converting the data to a second format, and wherein the updated data query comprises the converted data.

9. The method according to claim 1, wherein the unified query comprises a first unified query, and comprising storing the result to a cache, receiving a second unified query identical to the first unified query, and responding to the second unified query with the cached result.

10. The method according to claim 1, wherein the unified query comprises a conditional value.

11. The method according to claim 1, wherein the first and second responses comprise multiple data elements, and wherein the unified query specifies one or more of the data elements for exclusion, and comprising removing the specified one or more of the data elements from the result.

12. The method according to claim 1, and comprising storing, to a memory, a set of query identifiers and a set of corresponding stored unified queries, wherein receiving the unified query comprises receiving an identifier, and identifying, in the memory, a given query identifier matching the received identifier, wherein the received unified query comprises a stored unified query corresponding to the identified query identifier.

13. A method, comprising:
receiving, by a query processing server from a client, a unified query;
extracting, from the unified query, a data query for a data source on a first server and a call to an application programming interface (API) for an application executing on a second server;
forwarding the data query to the first server;
receiving, from the first server, a first response to the data query;
extracting from the first response one or more parameters;
updating, by a processor, the call to the API to include the extracted one or more parameters;
forwarding, to the second server, the updated call to the API;

receiving, from the application executing on the second server, a second response to the updated call;

generating, based on the first and second responses, a result for the received unified query; and conveying the generated result to the client.

14. The method according to claim 13, wherein the API comprises a public API or a private API.

15. The method according to claim 13, wherein forwarding the data query comprises transmitting, to an API hub in communication with the first server, a request to transmit the data query to the first server, and wherein receiving the first response comprises receiving the first response from the API hub.

16. The method according to claim 13, wherein the data source on the first server is selected from a list of data sources consisting of a database, a file and cached data.

17. The method according to claim 16, wherein the data query is for a table in the database, and wherein receiving the first response comprises receiving a source and a format for the table.

18. The method according to claim 13, wherein the unified query comprises at least one node and an additional parameter specifying a given node as an optional node, and comprising detecting that there is no data for the optional node, and returning a null value for the optional node.

19. The method according to claim 13, wherein the result comprises one or more nodes, wherein the unified query comprises an alias for a given node, and comprising updating the node in the response with the alias.

20. The method according to claim 13, wherein the first response comprises data having a first format, wherein extracting the one or more parameters comprises converting the data to a second format, and wherein the updated data query comprises the converted data.

21. The method according to claim 13, wherein the unified query comprises a first unified query, and comprising storing the result to a cache, receiving a second unified query identical to the first unified query, and responding to the second unified query with the cached result.

22. The method according to claim 13, wherein the unified query comprises a conditional value.

23. The method according to claim 13, wherein the first and second responses comprise multiple data elements, and wherein the unified query specifies one or more of the data elements for exclusion, and comprising removing the specified one or more of the data elements from the result.

24. The method according to claim 13, and comprising storing, to a memory, a set of query identifiers and a set of corresponding stored unified queries, wherein receiving the unified query comprises receiving an identifier, and identifying, in the memory, a given query identifier matching the received identifier, wherein the received unified query comprises a stored unified query corresponding to the identified query identifier.

25. A computer software product, comprising a non-transitory computer-readable medium, in which program instructions are stored, which instructions, when read by a computer, cause the computer:

to receive, from a client, a unified query;

to extract, from the unified query, a call to an application programming interface (API) for an application executing on a first server and a data query for a data source on a second server;

to forward, to the first server, the call to the API;

to receive from the application executing on the first server a first response to the call;

to extract from the first response one or more parameters;

to update the data query for the data source to include the extracted one or more parameters;

to forward to the second server the updated data query for the data source;

to receive from the second server a second response to the updated data query;

to generate, based on the first and second responses, a result for the received unified query; and to convey the generated result to the client.

26. A computer software product, comprising a non-transitory computer-readable medium, in which program instructions are stored, which instructions, when read by a computer, cause the computer:

to receive, from a client, a unified query;

to extract, from the unified query, a data query for a data source on a first server and a call to an application programming interface (API) for an application executing on a second server;

to forward the data query to the first server;

to receive from the first server a first response to the data query;

to extract from the first response one or more parameters;

to update the call to the API to include the extracted one or more parameters;

to forward to the second server the updated call to the API;

to receive from the application executing on the second server a second response to the updated call;

to generate, based on the first and second responses, a result for the received unified query; and to convey the generated result to the client.

* * * * *